United States Patent [19]
Ichikawa

[11] Patent Number: 6,072,626
[45] Date of Patent: *Jun. 6, 2000

[54] BINOCULAR WITH ROTATION TRANSMITTING SYSTEM

[75] Inventor: Mitsuru Ichikawa, Saitama-Ken, Japan

[73] Assignee: Asahi Kogaku Kogyo Kabushiki Kaisha, Tokyo, Japan

[*] Notice: This patent is subject to a terminal disclaimer.

[21] Appl. No.: 09/014,973

[22] Filed: Jan. 28, 1998

[30] Foreign Application Priority Data

Jan. 29, 1997 [JP] Japan ................................. 9-029617

[51] Int. Cl.[7] ............................................. G02B 23/00
[52] U.S. Cl. ............................................ 359/416; 359/422
[58] Field of Search ............................. 359/407, 408, 359/409, 411, 412, 413, 414, 415, 416, 417, 418, 422, 480, 481, 482

[56] References Cited

U.S. PATENT DOCUMENTS

| | | | |
|---|---|---|---|
| 3,528,724 | 9/1970 | Bertin | 359/413 |
| 4,396,257 | 8/1983 | Nakamura | 359/414 |
| 4,616,907 | 10/1986 | Nakamura | 359/414 |
| 5,071,242 | 12/1991 | Yanagisawa | 359/416 |
| 5,583,692 | 12/1996 | Funatsu | 359/422 |

FOREIGN PATENT DOCUMENTS

| | | | |
|---|---|---|---|
| 0009711 | 1/1981 | Japan | 359/407 |
| 61-31286 | 9/1986 | Japan . | |
| 0114014 | 5/1991 | Japan | 359/422 |
| 405181070 | 7/1993 | Japan | 359/412 |

*Primary Examiner*—Cassandra Spyrou
*Assistant Examiner*—Mark A. Robinson
*Attorney, Agent, or Firm*—Greenblum & Bernstein, P.L.C.

[57] ABSTRACT

A binocular includes first and second swingable bodies respectively accommodating telescope systems. The binocular further includes two drive rings respectively provided to the swingable bodies and an operation knob. A transmission unit is provided to transmit the rotation of the operation knob to the drive rings. The transmission unit includes two pairs of a first gear and a second gear. The first gear and the second gear engage with each other so that a contact point of pitch circles thereof is located on each of the swing axis.

17 Claims, 11 Drawing Sheets

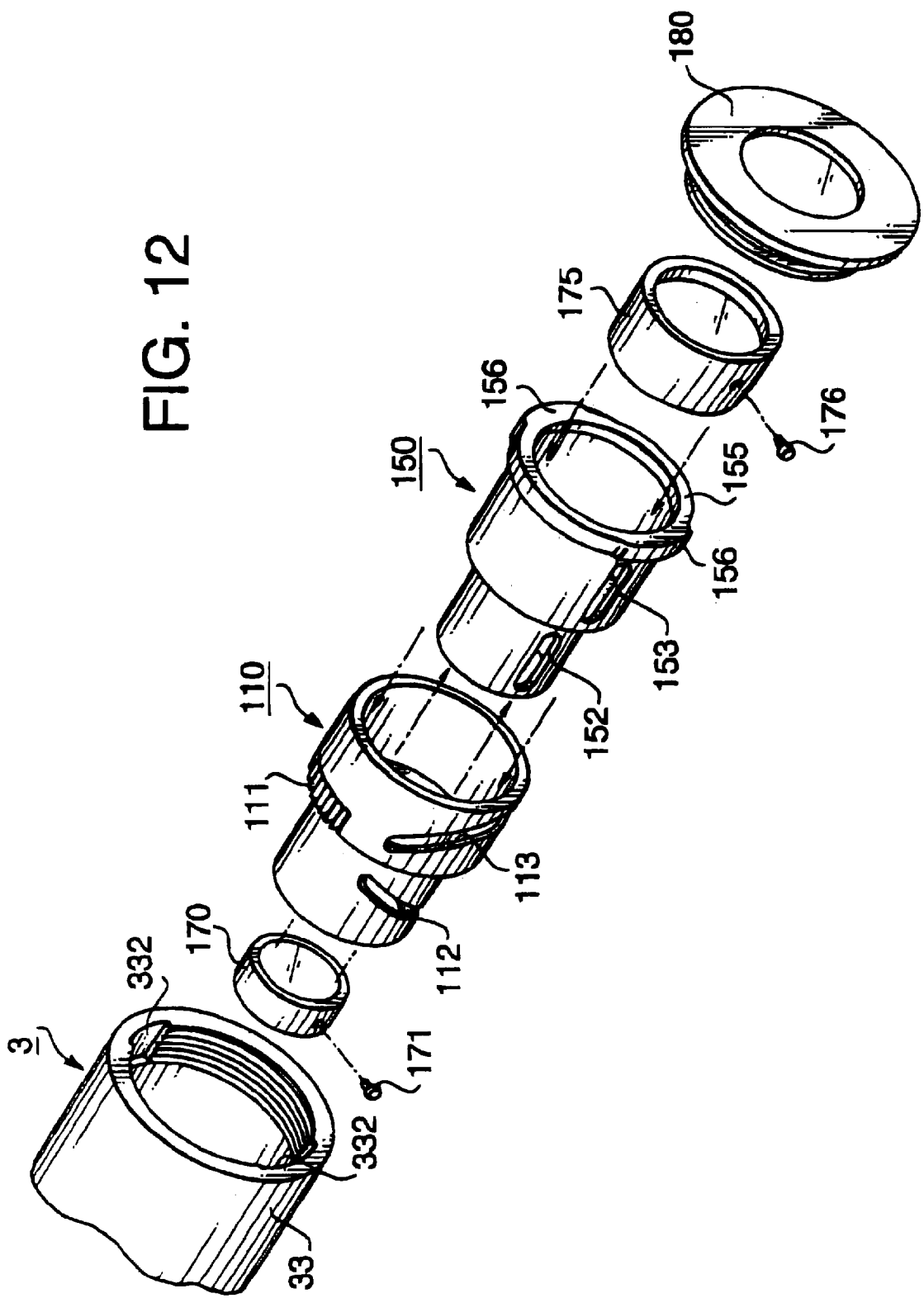

BINOCULAR WITH ROTATION TRANSMITTING SYSTEM

BACKGROUND OF THE INVENTION

The present invention relates to a binocular.

Generally, a binocular includes a mechanism such as a magnifying-power-varying mechanism and an operation knob for manually operating the mechanism. In case of a binocular with the magnifying-power-varying mechanism, two drive rings (for example, cam rings) are provided to left and right lens barrels for moving the lens groups. In order to transmit the rotation of the operation knob to the drive rings, the conventional binocular is provided with a gear train connecting the operation knob and the drive rings.

However, if the binocular further has an interpupillary adjustment mechanism (in which the lens barrels are swung about certain swing axes), the relative rotational position of adjacent gears of the gear train may be changed by the swinging of the lens barrels. If the relative rotational position of the adjacent gears changes, the drive rings are intentionally rotated. Thus, when the interpupillary adjustment is performed, the magnifying-power may be unintentionally varied.

SUMMARY OF THE INVENTION

It is therefore an object of the present invention to provide an improved binocular wherein it is prevented that an interpupillary adjustment causes unintentional changes in magnifying-power-varying mechanism or the like.

According to an aspect of the present invention, a binocular includes two parallel telescope systems, two swingable bodies (swingable about swing axes) respectively accommodating the telescope systems, at least one drive ring provided to at least one of the swingable bodies, an operation knob which-is operated to rotate the drive ring, and a transmission unit which transmits the rotation of the operation knob to the drive ring. The transmission unit includes a first rotating body linked to the operation knob and a second rotating body linked to the drive ring. The first and second rotating bodies engage with each other so that the engaging position is located on the swing axis.

With such an arrangement, since the engaging position (of first and second rotating bodies) is located on the swing axis, when the second rotating body is swung about the swing axis along with the swingable body, the second rotating body is not rotated with respect to the first rotating body. Thus, it is prevented that the drive ring is unintentionally rotated by the interpupillay adjustment.

In a particular arrangement, two drive rings are respectively provided to both swingable bodies. In such case, the transmission unit includes two pairs of the first and second rotating bodies. With this, the above described arrangement can be employed to a magnifying-power-varying mechanism. Thus, it is prevented that the magnifying-power is unintentionally varied when the interpupillay adjustment is performed.

Further, the binocular further includes a supporting body which rotatably supports the swingable bodies. In such case, the operation knob is provided on the supporting body, while the second rotating bodies are respectively provided on the two swingable bodies.

In a particular case, first and second gears are used as the first and second rotating bodies. In such case, the above-described engaging position is a contact point on which pitch circles of the first and second gears contact with each other. Further, a gap is provided between engaging gear teeth of the first and second gears. When the swingable body is swung, the second gear is swung within a range of the gap so as to allow the swinging of the swingable body. In another particular case, first and second rollers are used as the first and second rotating bodies. In such came, the above-described engaging position is a contact point on which the first and second rollers contact with each other. The second roller is made of an elastic material, so that the second roller deforms to allow the swinging of the swingable body.

In particular, each telescope system has an object system and an eyepiece system. An eyepiece optical axis of the eyepiece system is parallel but off-centered with an object optical axis of a front-most lens of the object system. The swingable bodies are swingable about the object optical axes.

According to another aspect of the present invention, there is provided a rotation transmitting system including first and second rotating bodies engaging with each other. The second rotating body is swingable about a swing axis which is different from any of rotational axes of the rotating bodies. The engaging position of the first and second rotating bodies is located on the swing axis. In a particular case, first and second gears are used as the first and second rotating bodies. The above-described engaging position is a point on which pitch circles of the first and second rotating bodies contact with each other. The above-described engaging position is a point on which the first and second rollers contact with each other. In another particular case, first and second rollers are used as the first and second rotating bodies. The second roller being made of an elastic material.

BRIEF DESCRIPTION OF THE DRAWINGS

FIG. 12 is an exploded perspective view of an arrangement in which a cam ring moves lenses.

DESCRIPTION OF THE PREFERRED EMBODIMENT

The present invention is described with reference to the preferred embodiment thereof.

Figure 1:
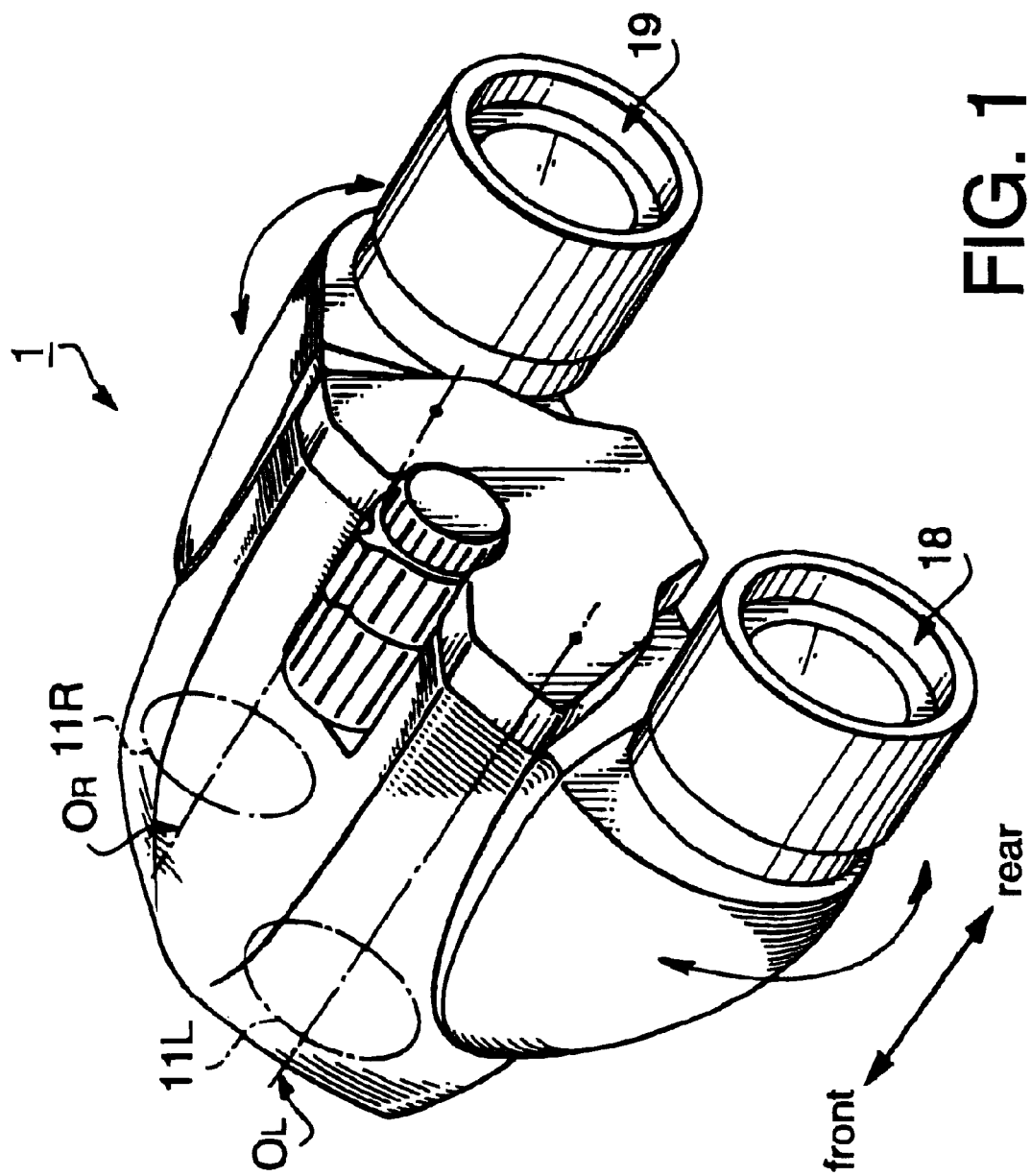
FIG. 1 is a perspective view of binocular according to an embodiment of the present invention.
Figure 2:
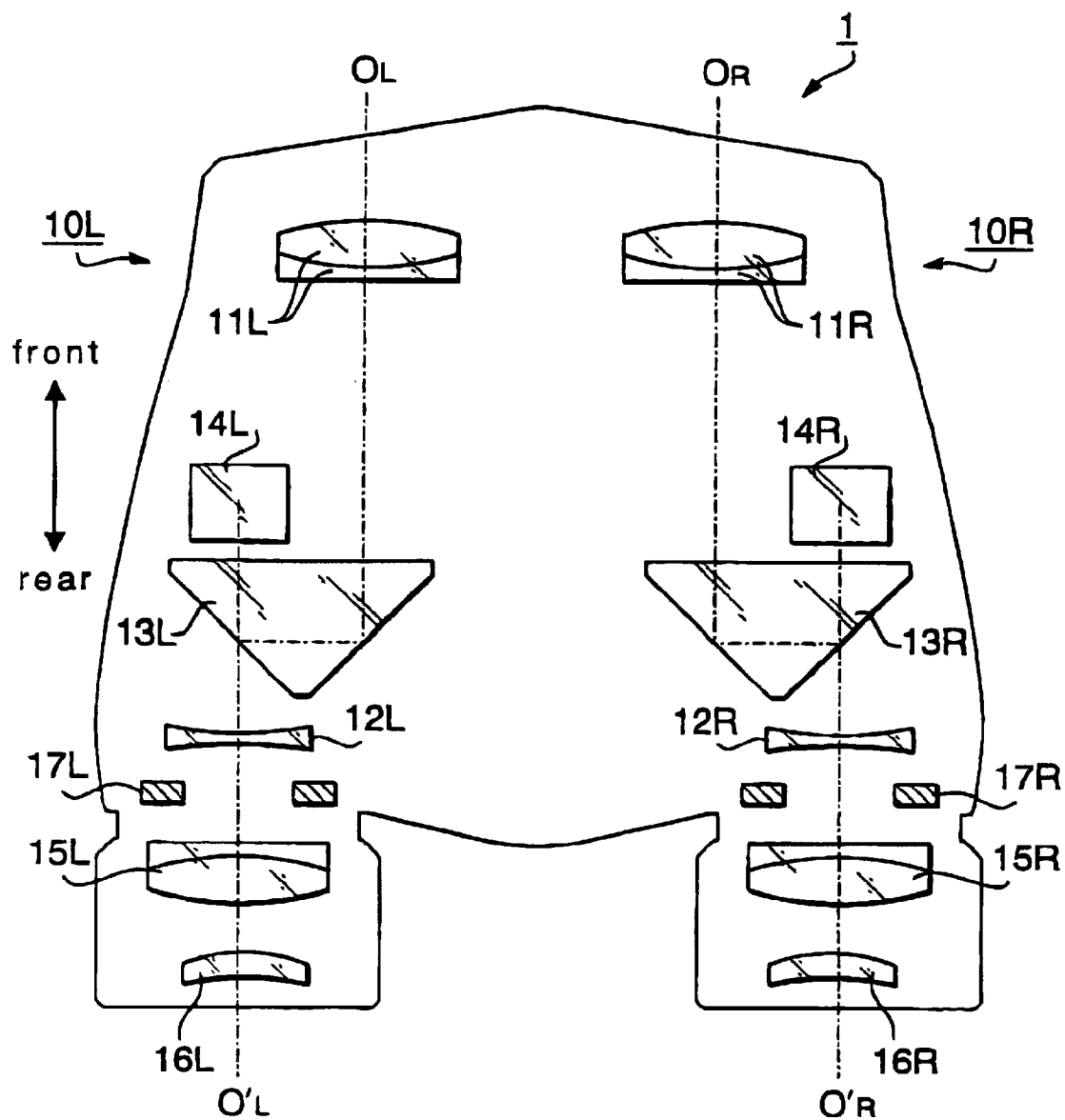
FIG. 2 is a schematic view showing an optical system of the binocular of FIG. 1.

FIG. 1 is a perspective view showing an external view of a binocular 1 according to the embodiment. FIG. 2 shows optical systems of the binocular 1. As shown in FIG. 2, the binocular 1 includes left and right telescope systems 10L and 10R. Since the telescope systems 10L and 10R are symmetrical with each other, the description will deal with the left telescope system 10L and the corresponding reference numbers for the right telescope system 10R will be shown in brackets.

The telescope system 10L (10R) includes first lens 11L (11R), porro prisms 13L and 14L (13R and 14R), second lens 12L (12R), third lens 15L (15R) and fourth lens 16L (16R). The first lens 11L (11R) and the second lens 12L (12R) constitute an objective system. The third lens 15L (15R) and the fourth lens 16L (16R) constitute an eyepiece system. The porro prisms 13L and 14L (13R and 14R) constitute an erecting system. A field stop 17L (17R) is disposed where an image is formed by the objective system. Eyepiece optical axes O'L and O'R of the left and right eyepiece systems are respectively parallel but off-centered with object optical axes OL and OR of the first lenses 11L and 11R. Hereinafter, an objective side of the binocular 1 is referred to as 'front', while an eyepiece side of the binocular 1 is referred to as 'rear'.

Figure 3:
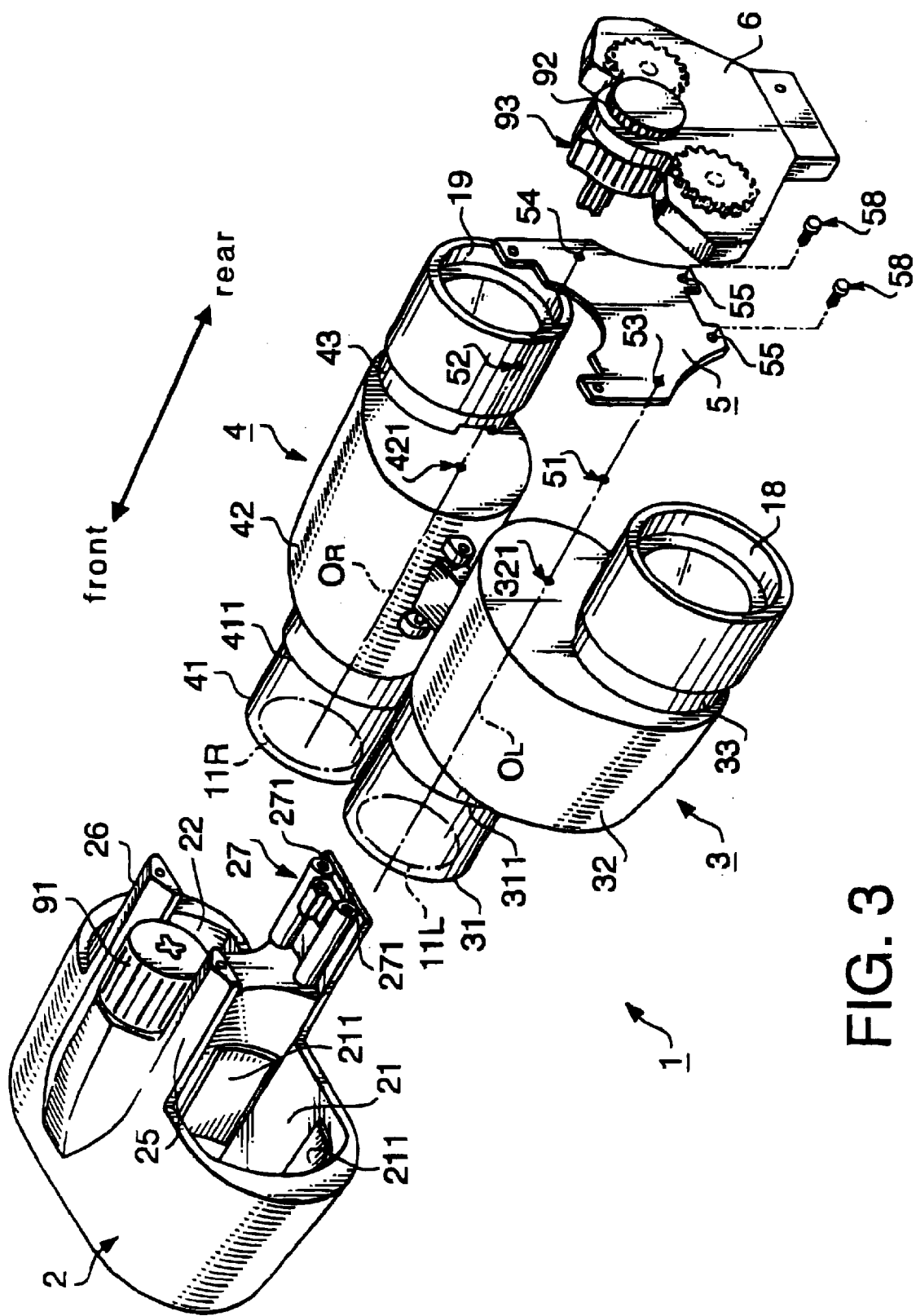
FIG. 3 is an exploded perspective view of the binocular of FIG. 1.

FIG. 3 is an exploded perspective view of the binocular 1. The binocular 1 includes left and right swingable bodies 3 and 4 respectively accommodating the left and right telescope systems 10L and 10R (FIG. 2). The left swingable body 3 includes a front barrel 31 and a rear barrel 33 which are parallel but off-centered with each other. An intermediate barrel 32 is provided between the front and rear barrels 31 and 33. The first lens 11L (FIG. 2) is accommodated in the front barrel 31. The second lens 12L and the prisms 13L and 14L (FIG. 2) are accommodated in the intermediate barrel 32. The third and fourth lenses 15L and 16L (FIG. 2) are accommodated in the rear barrel 33. The rear end of the rear barrel 33 constitutes a left eyepiece portion 18.

Similarly, the right swingable body 4 includes a front barrel 41, a rear barrel 43 and an intermediate barrel 42. The first lens 11R (FIG. 2) is accommodated in the front barrel 41. The second lens 12R and the prisms 13R and 14R (FIG. 2) are accommodated in the intermediate barrel 42. The third and fourth lenses 15R and 16R (FIG. 2) are accommodated in the rear barrel 43. The rear end of the rear barrel 43 constitutes a right eyepiece portion 19.

In order to swingably support the left and right swingable bodies 3 and 4, the binocular 1 is further provided with a front support 2 and a rear support 5. The front support 2 is provided with two bores 21 and 22. The front barrels 31 and 41 have cylindrical shapes and are fit into the bores 21 and 22. The rear support 5 is a plate member which supports the rear ends of the intermediate barrels 32 and 42 via balls 51 and 52 (respectively positioned on the object optical axes OL and OR). The rear support 5 has holes 53 and 54 positioned on the object optical axes OL and OR. Further, recesses 321 and 421 are formed on the rear ends of the intermediate barrels 32 and 42 and on the object optical axes OL and OR. The balls 51 and 52 are supported (on the object optical axes OL and OR) by the holes 53 and 54 and by the recesses 321 and 421. An extending portion 27 is extended rearward from the bottom of the front support 2. The extending portion 27 is provided with two screw holes 271 at the rear end thereof. The rear support 5 is provided with two through-holes 55 positioned corresponding to the screw holes 271. By inserting two screws 58 through the through-holes 55 of the rear support 5 and by engaging the screws 58 into screw holes 271 of the extending portion 27, the left and right swingable bodies 3 and 4 are sandwiched by the front and rear supports 5 and 6 and supported in such a manner that the swingable bodies 3 and 4 are respectively swingable about the object optical axes OL and OR.

The swingable bodies 3 and 4 have shoulder portions 311 and 411 which abut abutting portions 211 and 221 formed in the bore 21 and 22 (the right abutting portion 221 is not shown). Since the swingable bodies 3 and 4 are urged by the rear support 5 against the front support 2, the positions (in the direction parallel to the object optical axes OL and OR) of the swingable bodies 3 and 4 are determined.

The binocular 1 is so constituted that the focus adjustment is performed by moving the left and right first lenses 11L and 11R along the object optical axes OL and OR, while the diopter correction is performed by moving the right first lens 11R along the object optical axis OR . A focus adjusting knob 91 is disposed at the top center of the front support 2, which is to be operated for focus adjustment. A rear cover 6 is provided to the rear support 5, on which a diopter correction knob 92 is disposed. The description of the arrangement for the focus adjustment and the diopter correction is omitted.

The arrangement for varying magnifying-power is described. The binocular 1 is so constituted as to vary the magnifying-power thereof by moving the second lenses 12L and 12R and the third lens 15L and 15R in the direction parallel to the object optical axes OL and OR.

Figure 4:
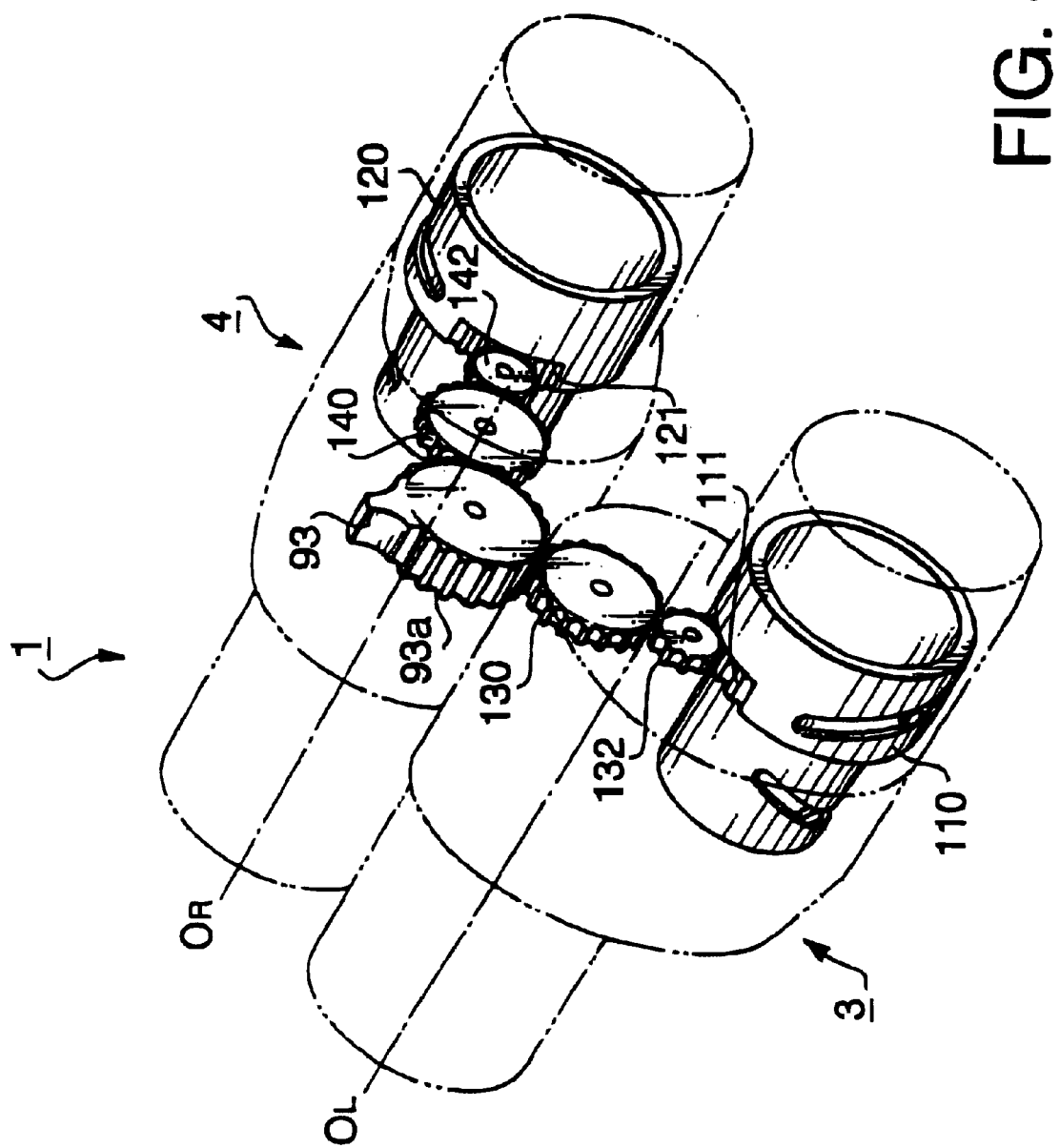
FIG. 4 is a perspective view illustrating an arrangement for varying magnifying-power.

FIG. 4 is a perspective view illustrating the arrangement for varying magnifying-power. A left cam ring 110 is provided in the slidable body 3, for moving the second lens 12L and the third lens 15L (FIG. 2). A right can ring 120 is provided in the slidable body 4, for moving the second lens 12R and the third lens 15R (FIG. 2) . The left and right cam rings 110 and 120 are operated by a magnifying-power-varying knob 93 located at a top center of the binocular 1. In order to transmit a rotation of the magnifying-power-varying knob 93 to the left cam ring 110, a left first gear 130 and a left second gear 132 are provided between the magnifying-power-varying knob 93 and the left cam ring 110. Similarly, a right first gear 140 and a right second gear 142 are provided between the magnifying-power-varying knob 93 and the right cam ring 120. The left and right first gears 130 and 132 engage a peripheral gear 93a formed on the periphery of the magnifying-power-varying knob 93. The left and right second gears 132 and 142 respectively engage peripheral gears 111 and 121 formed on the periphery of the cam rings 110 and 120. With such an arrangement, if the magnifying-power-varying knob 93 is rotated, the can rings 110 and 120 are synchronously rotated.

The engaging position on which the left first gear 130 and left second gear 132 engage with each other is located on the left object optical axis OL (that is, the swing axis of the left swingable body 3). Similarly, the engaging position on which the right first gear 140 and right second gear 142 engage with each other is located on the right object optical axis OR (that is, the swing axis of the right swingable body 4).

Figure 5:
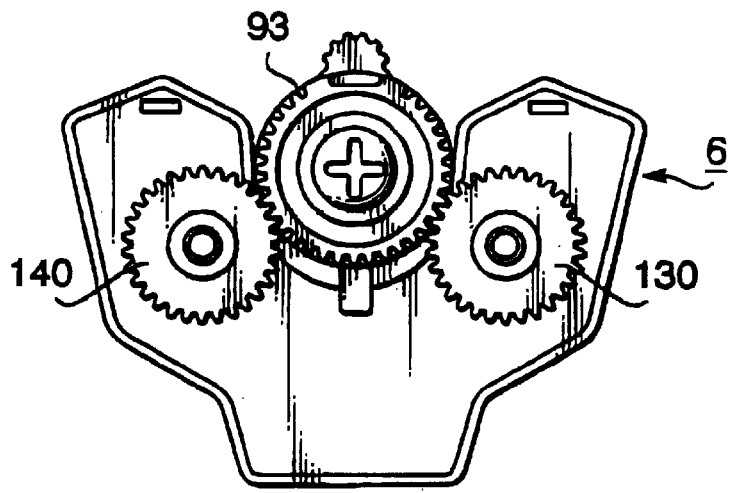
FIG. 5 is a front view of a rear cover.
Figure 6:
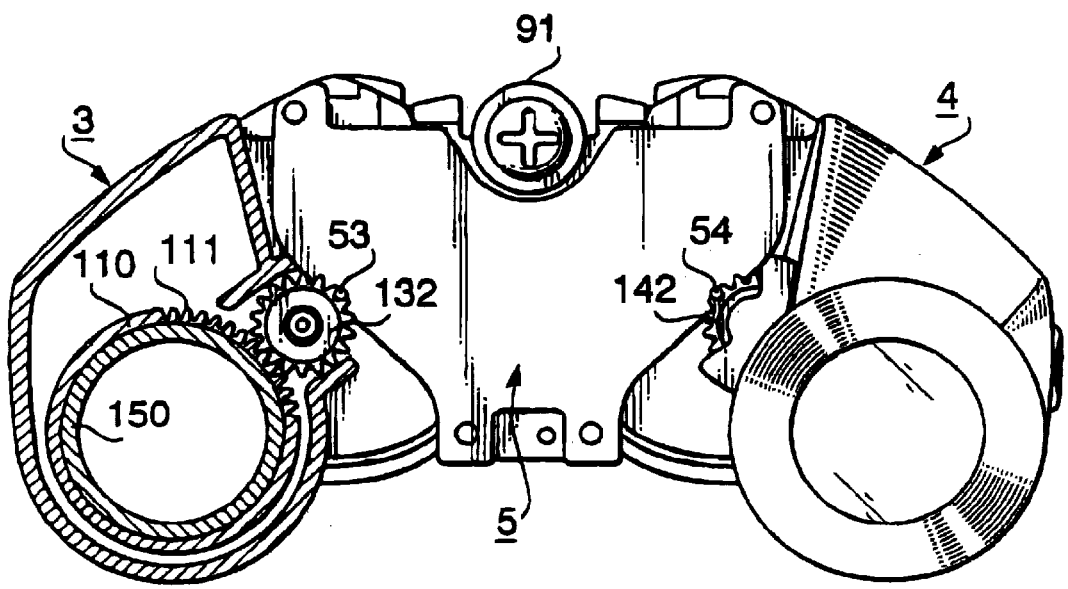
FIG. 6 is a rear view of swingable bodies and a rear support.

FIG. 5 is a front view of the rear cover 6. FIG. 6 is a rear view of the swingable bodies 3 and 4 and the rear support 5. As shown in FIG. 5, the magnifying-power-varying knob 93 and the first gears 130 and 140 are provided to the rear cover 6. As shown in FIG. 6, the second gears 132 and 142 are provided in the swingable bodies 3 and 4 so that the second gears 132 and 142 are partially protruded to the exterior of the swingable body 3 and 4. When the rear cover 6 is mounted to the rear support 5, the first gears 130 and 140 respectively come in engagement with second gears 132 and 142.

Figure 7:
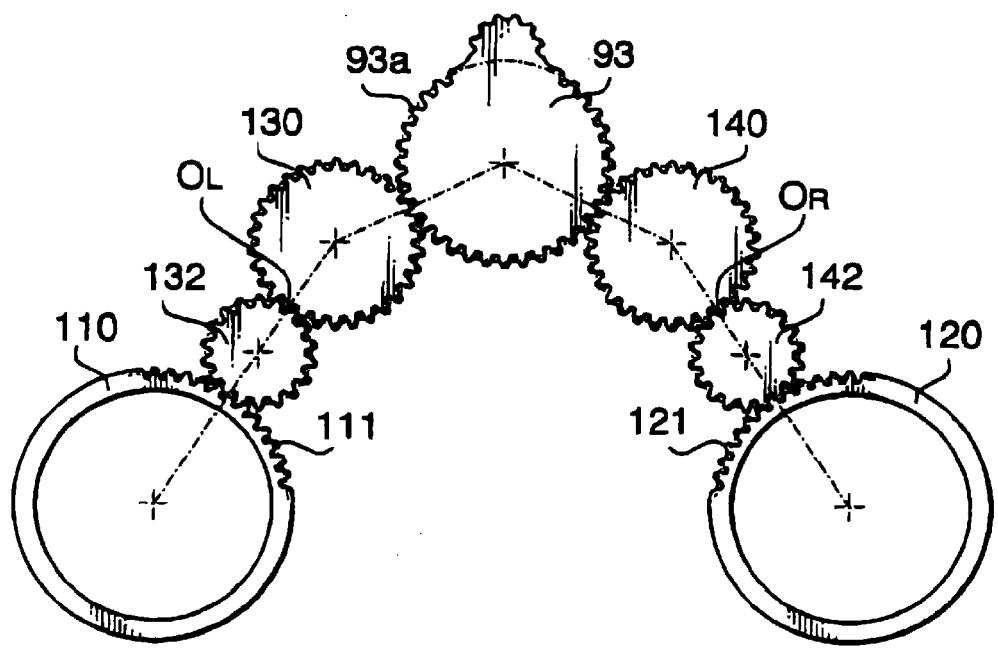
FIG. 7 is a rear view illustrating the engagement of gears when the interpupillary is intermediate.
Figure 8:
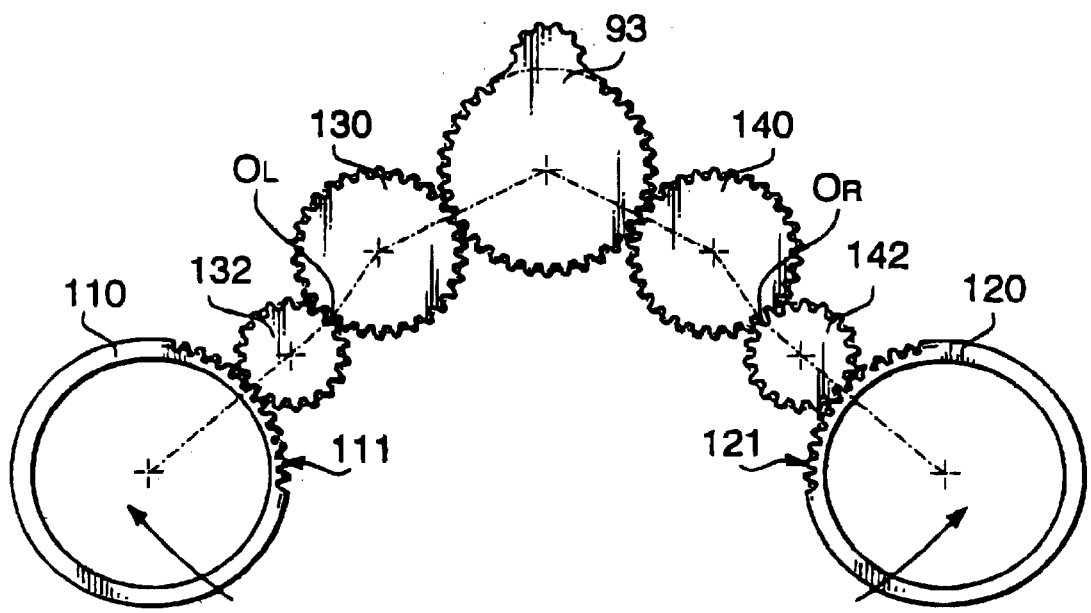
FIG. 8 is a rear view illustrating the engagement of gears when the interpupillary is maximum.
Figure 9:
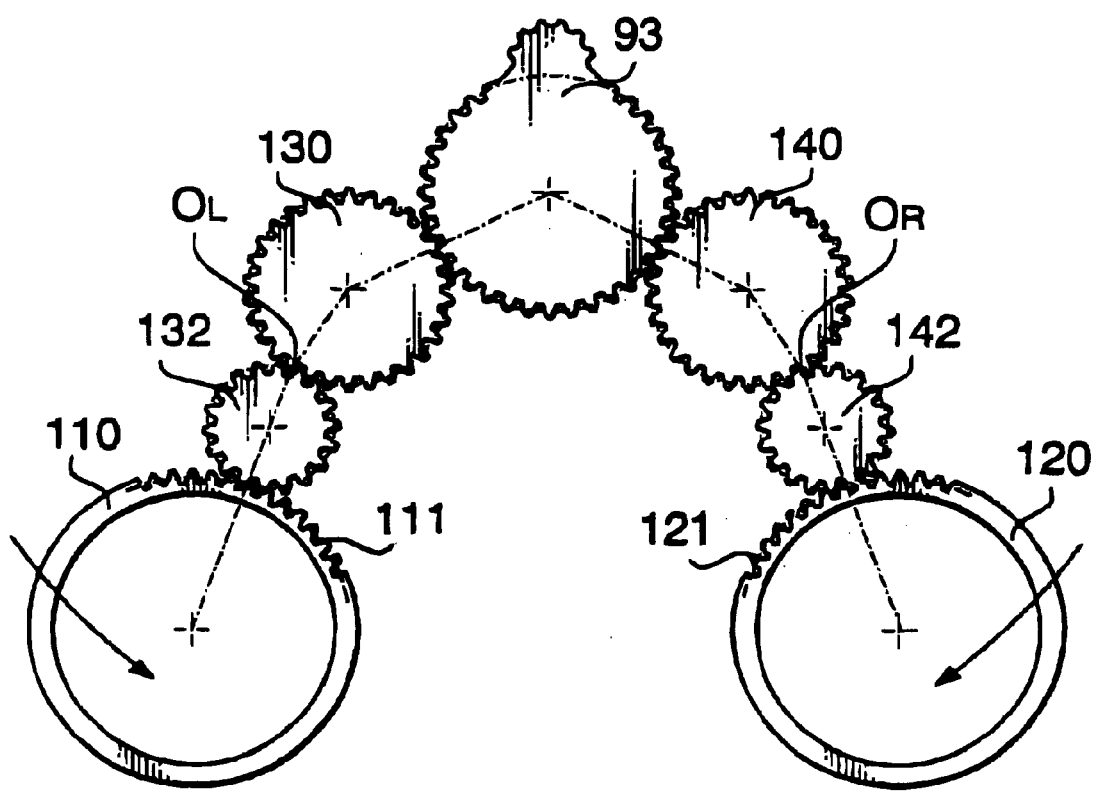
FIG. 9 is a rear view illustrating the engagement of gears when the interpupillary is minimum.

The relationship between the magnifying-power-varying mechanism and the interpupillary adjustment is described. FIGS. 7, 8 and 9 show the engagement of the gears of the magnifying-power-varying mechanism when the interpupillary distance is intermediate, maximum and minimum. When the interpupillary distance is intermediate as shown in FIG. 7, a line connecting the centers of the left first gear 130 and the left second gear 132 and intersecting the swing axis (shown by the left object axis OL) is straight. When the interpupillary distance is maximum as shown in FIG. 8, the left second gear 132 and the left cam ring 110 are swung outward about the left object optical axis OL. When the interpupillary is minimum as shown in FIG. 9, the left second gear 132 and the left cam ring 110 are swung inward about the left object optical axis OL. The right second gear 142 and the right cam ring 120 are swung in a symmetrical manner with respective to the left second gear 142 and the left cam ring 110.

Figure 10A:
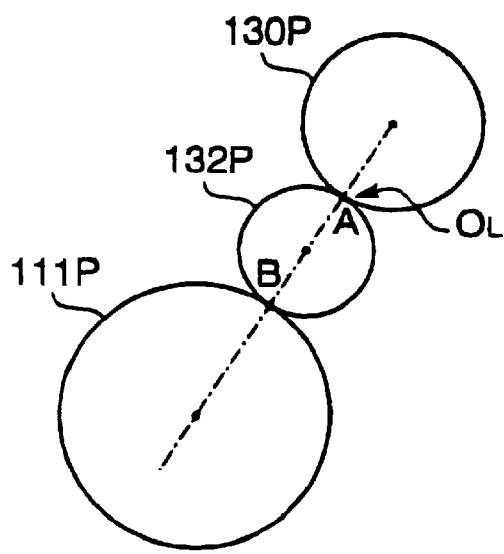
FIGS. 10A, 10B and 10C are schematic views respectively illustrating the relationship of pitch circles of the gears of FIGS. 7, 8 and 9.
Figure 10B:
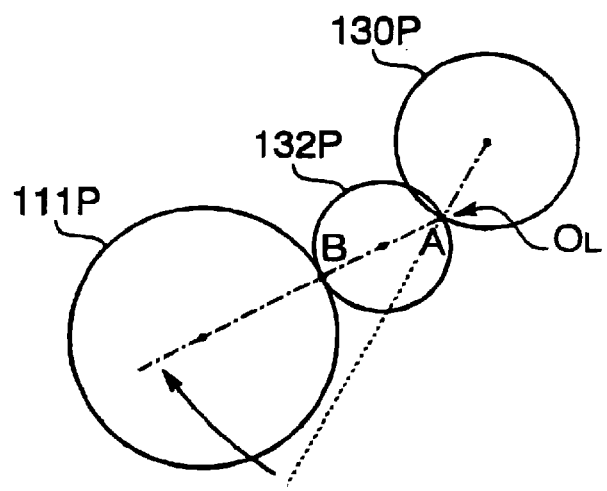
Figure 10C:
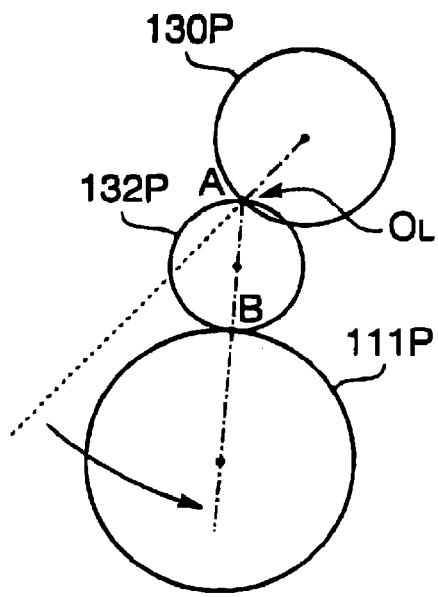

FIGS. 10A, 10B and 10C are schematic views illustrating the relationship of pitch circles 130P, 132P and 111P of the left first gear 130, the left second gear 132 and the left sector gear 111 (of the left cam ring 110). FIGS. 10A, 10B and 10C respectively correspond to the FIGS. 7, 8 and 9. In FIG. 10A, a point A is defined on the pitch circle 132P so that the point A contacts the pitch circle 130P when the intermediate distance is intermediate. The point A is positioned on the swing axis (shown by the object optical axis OL). Further, a point B is defined on the pitch circle 130P so the point B is opposite to the point A with respect to the center of the pitch circle 132P. In FIG. 10A, the point B contacts the pitch circle 111P. When the pitch circles 132P and 111P are swung about the swing axis as shown in FIG. 10B, the pitch circles 130P and 132P intersect with each other on two points (one of which is the above-defined point A). This is possible due to the existence of the backlash between the first gear 130 and the second gear 132 as described below. Since the point A corresponds to the swing axis, the point B still contacts the pitch circle 111P as shown in FIG. 10B. Thus, the relationship between the left second gear 132 and the left sector gear 111 in FIG. 10B is the same as that of FIG. 10A. In other word, engaging gear tooth of the left second gear 132 and the left sector gear 111 in FIG. 10B are same as that of FIG. 10A. Similarly, when the pitch circles 132P and 111P are swung as shown in FIG. 10C, the relationship between the left second gear 132 and the left sector gear 111 is the same as that of FIG. 10A.

Accordingly, the left sector gear 111 (of the left cam ring 110) is not rotated by the left second gear 132 by when the interpupillary adjustment is performed. Similarly, the right sector gear 121 (of the right cam ring 120) is not rotated by the right second gear 142 when the interpupillary adjustment is performed.

Figure 11A:
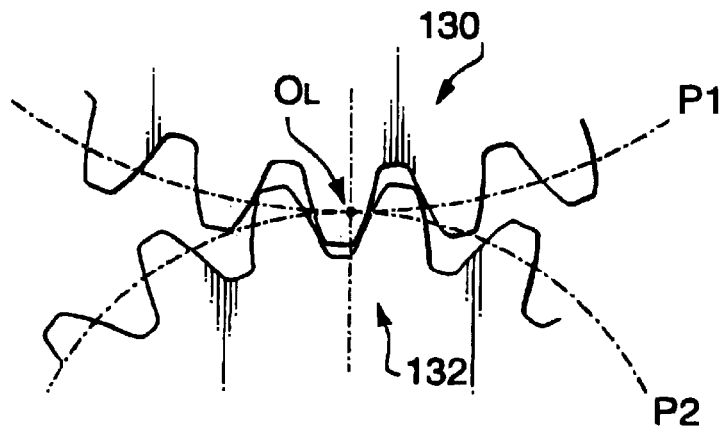
FIGS. 11A, 11B and 11C are enlarged views respectively illustrating the engaging portion of the gears of FIGS. 7, 8 and 9.
Figure 11B:
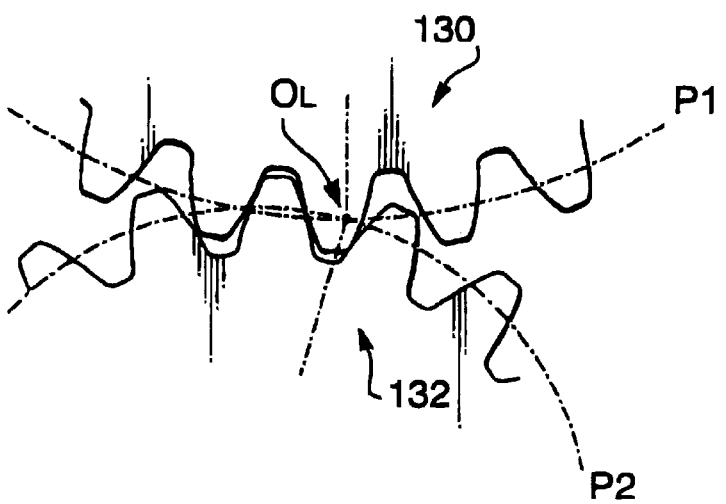
Figure 11C:
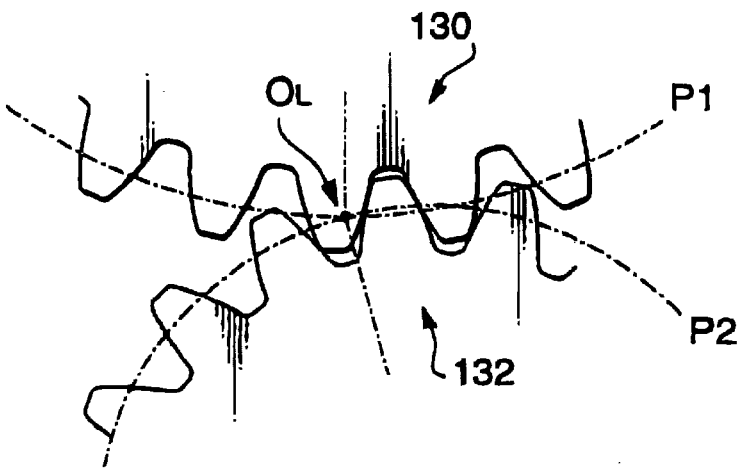

The engagement of the gears of the magnifying-power-varying mechanism is detailed with respect to the FIGS. 11A, 11B and 11C. FIGS. 11A, 11B and 11C are enlarged views illustrating the area of the engagement of the left first gear 130 and the left second gear 132, respectively corresponding to FIGS. 7, 8 and 9. As shown in FIG. 11A, there is a backlash between two engaging teeth of the first and second gears 130 and 132. When the second gear 132 is swung about the object optical axis OL as shown in FIGS. 12B and 12C, the pitch circles 130P and 132P are intersect with each other on two points. In this state, the second gear 132 is swung within a range of the backlash, which allows the swinging of the second gear 132 about the object optical axis OL.

With such an arrangement, the interpupillary adjustment does not affect the rotation of the cam rings 110 and 120.

It is preferred that the pitch circle diameter of the second gear 132 is smaller than that of the first gear 130, so that a relatively large backlash can be provided between engaging teeth of the first and second gears 130 and 132. It is alternatively possible that the pitch circle diameter of the second gear 132 is larger than that of the first gear 130.

The arrangement in which the cam rings 110 and 120 move the lens groups is described. Since the left and right cam rings move the lens groups in a similar manner, the description will deal with the arrangement in which the left cam ring moves the lens groups.

As shown in FIG. 12, the second lens 12L and the third lens 15L (FIG. 2) are respectively supported in second and third lens frames 170 and 175. The fourth lens 16L is fixed to an eyepiece ring 180 which is mounted to the rear end of the swingable body 3. The second and third lens frames 170 and 175 are respectively provided with pins 171 and 176. The cam ring 110 has two cam grooves 112 and 113 for moving the second and third lens frames 170 and 175. A guide ring 150 is provided in the cam ring 110, which has linear guide grooves 152 and 153. The guide ring 150 has flange portions 156 at the rear ends thereof, which engage recesses 322 formed at the rear end of the swingable body 3, so that the guide ring 150 does not rotate with respect to the lens barrel 3. The second lens frame 170 is inserted in the guide ring 150 so that the cam pin 171 is inserted through the cam groove 112 and the guide groove 152. Similarly, the third lens frame 175 is inserted in the guide ring 150 so that the cam pin 176 is inserted through the cam groove 113 and the guide groove 153. With such an arrangement, when the cam ring 110 is rotated, the second lens 12L and the third lens 15L are moved in the direction parallel to the object optical axis OL (FIG. 4).

As constructed above, according to the binocular of the embodiment, the interpupillary adjustment does not cause unintentional rotation of the cam rings 110 and 120. Thus, the magnifying-power is not unintentionally changed by the interpupillary adjustment.

The second embodiment of the invention is described with reference to FIGS. 13A, 13B and 13C. In the second embodiment, first and second rollers 230 and 232 are used instead of the first and second gears 130 and 132 of the first embodiment. Further, a contact member 211 is provided to the cam ring 110 (FIG. 12) instead of the sector gear 111. The second embodiment is same as the first embodiment, except for the first and second rollers 230 and 232 and the contact member 211.

Figure 13A:
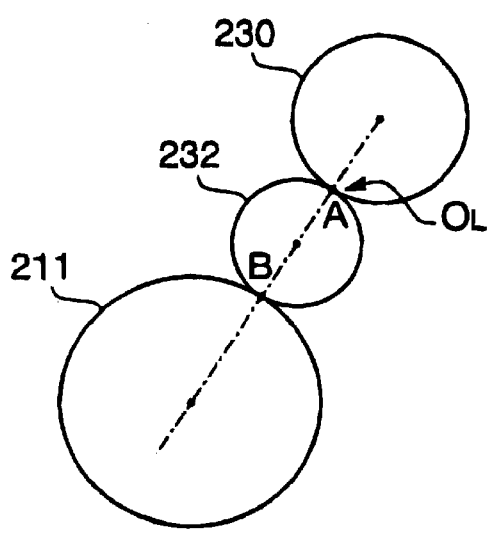
FIGS. 13A, 13B and 13C are schematic views illustrating rollers of the second embodiment.
Figure 13B:
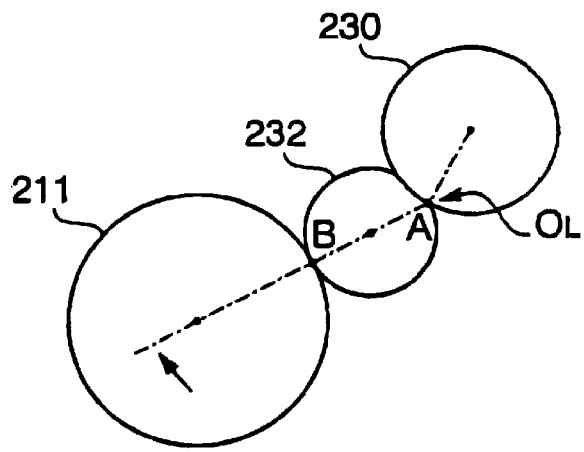
Figure 13C:
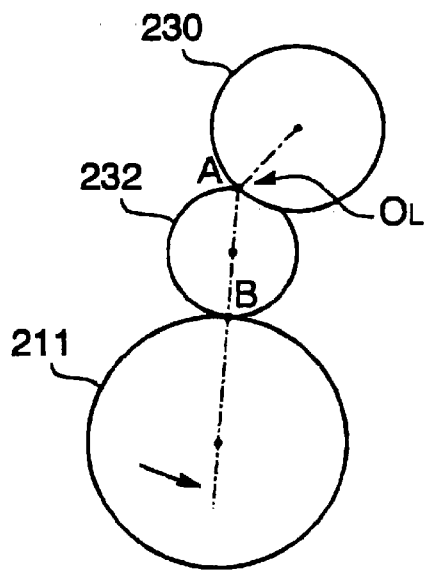

FIGS. 13A, 13B and 13C show the relationship of the first and second rollers 230 and 232 and the contact member 211 when the interpupillary distance is intermediate, maximum and minimum. The first roller 230 contacts the second roller 23s, and the second roller 232 contacts the contact member 211, thereby to transmit the rotation of the magnifying-power-varying knob 93 (FIG. 4) to the cam ring 110 (FIG. 12). The second roller 232 are made of an elastic material such as rubber. In the second embodiment, a contact point of the first and second transmission rollers 230 and 232 is located on the object optical axis OL as shown in FIG. 13A.

In FIG. 13A, a point A is defined on the second roller 232 so that the point A contacts the first roller 230 when the interpupillary distance is intermediate. Further, a point B is defined on the second roller 232 so that the point B is opposite to the point A with respect to the center of the second roller 232. When the second roller 232 and the contact member 211 are swung about the swing axis (shown by the object optical axis OL) as shown in FIG. 13B, it causes a deformation of the second roller 232. In this states, since the above-defined point A corresponds to the swing axis, the point B (which is opposite to the point A) still contacts the contact member 211. Thus, the relationship between the second roller 232 and the contact roller 211 in FIG. 13B is same as that of FIG. 13A. Similarly, when the second roller 232 and the contact member 211 are swung as shown in FIG. 13C, the relationship between the second roller 232 and the contact member 211 is same as that of FIG. 13A. Accordingly, the interpupillary adjustment does not cause the unintentional rotation of the cam rings.

It is preferred that the diameter of the second roller 232 is smaller than the diameter of the first roller 230, so that the second roller can be deformed in a relatively large amount. It is alternatively possible that the diameter of the second roller 232 is larger than that of the first roller 230.

As constructed above, according to the second embodiment, the magnifying-power is not unintentionally changed by the interpupillary adjustment.

Although the structure and operation of a binocular is described herein with respect to the preferred embodiments, many modifications and changes can be made without departing from the spirit and scope of the invention.

The present disclosure relates to subject matter contained in Japanese Patent Application No. HEI 09-29617 filed on Jan. 29, 1997, which is expressly incorporated herein by reference in its entirety.

What is claimed is:

1. A binocular comprising:
   two parallel telescope systems;
   two swingable bodies respectively accommodating said telescope systems, said swingable bodies being respectively swingable about two parallel swing axes;
   at least one drive ring rotatably provided to at least one of said swingable bodies;
   an operation knob which is operated to rotate said drive ring; and
   a transmission unit which transmits the rotation of said operation knob to said drive ring, said transmission unit including a first rotating body linked to said operation knob and a second rotating body linked to said drive ring, said first and second rotating bodies engaging with each other,
   wherein the engaging position of said first and second rotating bodies is located on said swing axis of said swingable body to which said drive ring is provided.

2. The binocular according to claim 1, wherein said at least one drive ring comprises two drive rings respectively provided to both of said swingable bodies, and
   wherein said transmission unit includes two pairs of said first and second rotating bodies.

3. The binocular according to claim 2, further comprising a supporting body which rotatably supports said swingable bodies,
   wherein said operation knob and said first rotating bodies are disposed on said supporting body, while said second rotating bodies are respectively disposed on said swingable bodies.

4. The binocular according to claim 2, wherein said drive rings belong to a magnifying-power-varying mechanism.

5. The binocular according, to claim 1, said first and second rotating bodies respectively comprising first and second gears,
   wherein said engaging position is a point on which pitch circles of said first and second gear contact with each other.

6. The binocular according to claim 5, wherein a gap is provided between engaging gear teeth of said first and second gears, and
   wherein, when said swingable body is swung, said second gear is swung within a range of said gap so as to allow the swinging of said swingable body.

7. The binocular according to claim 5, wherein said first and second gears have different pitch circle diameters.

8. The binocular according to claim 1, wherein said first and second rotating bodies respectively comprise first and second rollers, and
   wherein said engaging position is a point on which said first and second rollers contact with each other, said second roller being made of an elastic material.

9. The binocular according to claim 8, wherein said first and second rollers have different diameters.

10. The binocular according to claim 1, wherein each of said telescope systems has an object system and an eyepiece system, an eyepiece optical axis of said eyepiece system being parallel but off-centered with an object optical axis of a front-most lens of said object system.

11. The binocular according to claim 10, wherein said swingable bodies are respectively swingable about said object optical axes.

12. A binocular comprising:
    two parallel telescope systems;
    first and second swingable bodies respectively accommodating said telescope systems, said swingable bodies being swingable about respective first and second swing axes for interpupillary adjustment;
    two drive rings respectively provided to said swingable bodies;
    an operation knob which is operated to rotate said drive rings; and
    a transmission unit which transmits the rotation of said operation knob to said drive rings, said transmission unit including two pairs of a first gear and a second gear,
    wherein said first and second gears of each pair engage with each other so that contact points of pitch circles of said first and second gears of each pair lie on the first and second swing axes, respectively.

13. The binocular according to claim 12, wherein each of said telescope systems has an object system and an eyepiece system, an eyepiece optical axis of said eyepiece system is parallel but off-centered with an object optical axis of a front-most lens of said object system.

14. The binocular according to claim 13, wherein said swingable bodies are swingable about said object optical axes.

15. The binocular according to claim 14, further comprising a supporting body which swingably supports said swingable bodies, wherein said operation knob is disposed on said supporting body.

16. The binocular according to claim 15, wherein said operation knob and said first gears are provided to said supporting body, while said second gears are respectively provided to said swingable bodies.

17. The binocular according to claim 14, wherein said drive rings belong to a magnifying-power-varying mechanism which moves lens groups of said telescope systems along said object optical axes.

* * * * *